United States Patent [19]

Wernicke et al.

[11] Patent Number: 5,660,770
[45] Date of Patent: Aug. 26, 1997

[54] RECYCLING A FIBER-REINFORCED THERMOPLASTIC

[75] Inventors: Michael Wernicke, Kelkheim; Detlef Skaletz, Mainz, both of Germany

[73] Assignee: Hoechst Aktiengesellschaft, Frankfurt, Germany

[21] Appl. No.: 400,848

[22] Filed: Mar. 8, 1995

[30] Foreign Application Priority Data

Mar. 10, 1994 [DE] Germany ............ 44 08 089.1

[51] Int. Cl.$^6$ ............ B29C 45/00; B29C 47/00
[52] U.S. Cl. ............ 264/38; 264/136; 264/140; 264/176.1; 264/328.18; 264/DIG. 69; 264/349; 425/DIG. 46
[58] Field of Search ............ 264/37, 140, 141, 264/142, 328.17, 328.18, 349, DIG. 69, 136, 137, 176.1; 425/DIG. 46

[56] References Cited

U.S. PATENT DOCUMENTS

| | | | |
|---|---|---|---|
| 5,041,258 | 8/1991 | Iiyama et al. | 264/328.18 |
| 5,310,600 | 5/1994 | Tsuya et al. | 264/140 |
| 5,336,455 | 8/1994 | Kelman | 264/DIG. 69 |
| 5,358,680 | 10/1994 | Boissonnat et al. | 264/328.18 |
| 5,362,431 | 11/1994 | Guerrini et al. | 264/140 |
| 5,424,020 | 6/1995 | Hara et al. | 264/328.18 |

FOREIGN PATENT DOCUMENTS

| | | | |
|---|---|---|---|
| 0548696 | 6/1993 | European Pat. Off. | |
| 1-241406 | 9/1989 | Japan | 264/328.18 |
| 4-175108 | 6/1992 | Japan | 264/328.17 |
| 1367960 | 9/1974 | United Kingdom | |
| 2047253 | 11/1980 | United Kingdom | 264/328.18 |

OTHER PUBLICATIONS

Chemical Abstracts, vol. 91 (1979), No. 158641y.
English Abstract DE A 40 16 410–A.
English Abstract EP 51 80 04–A.
Database WPI, Derwent Publications Ltd., London, Abstract No. 94–088947.
Chemical Abstracts, vol. 117, No. 26, Dec. 29, 1992, Abstract No. 252934y.

*Primary Examiner*—Mathieu D. Vargot
*Attorney, Agent, or Firm*—Curtis, Morris & Safford, P.C.

[57] ABSTRACT

A process which includes comminuting a first thermoplastic material, e.g. polypropylene, reinforced with short glass fiber (10–400 μm). 100 parts by weight of the comminuted material are mixed with 11–43 parts by weight of chips of a second thermoplastic material, which is reinforced with long glass fiber (about 10–20 mm). The melts of the two thermoplastic materials should be mutually mixable. The mixture is subjected to thermoplastic forming.

27 Claims, No Drawings

RECYCLING A FIBER-REINFORCED THERMOPLASTIC

FIELD OF THE INVENTION

The present invention relates to a process for recycling a thermoplastic material reinforced with short glass fiber.

BACKGROUND OF THE INVENTION

Fiber reinforced thermoplastics are generally used for producing shaped articles having stable mechanical properties, in particular by means of injection molding. The fiber reinforcement in the thermoplastics used is predominantly short glass, i.e. glass fiber up to about 500 µm in length.

The recycling of used articles or production scrap comprising short glass fiber reinforced thermoplastics customarily comprises comminution and re-forming/shaping, for example by injection molding. However, the reprocessing has an adverse effect on the mechanical properties of the thermoplastic materials, since the fiber lengths and also the fiber distribution change (cf. Chemical Abstracts Vol. 91 (1979), 158 641 y).

The reprocessed material is therefore predominantly re-used for purposes where the mechanical properties are not critical. It is also known to add further fillers, for example sawdust (DE-A-4 016 410), or binders such as novolaks (EP 0 518 004).

The present invention has for its object to develop a process for recycling short glass fiber reinforced thermoplastics whereby the recyclate (e.g. used articles or production scrap) can again be shaped into articles having mechanical properties which are at least equal to those of the virgin product.

SUMMARY OF THE INVENTION

This object is achieved by a process for recycling a short glass fiber reinforced thermoplastic material, which comprises comminuting short glass fiber reinforced thermoplastic material, mixing 100 parts by weight of the resulting comminuted material with about 11 to about 43 parts by weight of chips of a thermoplastic material which is mixable therewith in the melt but which is long glass fiber reinforced, and forming the mixture thermoplastically. The initial mixture contains from 10 to 30% by weight of long glass fibre reinforced thermoplastic and from 70 to 90% by weight of recycled short glass fiber reinforced thermoplastic. The short glass fiber reinforced thermoplastic material customarily used contains from 20 to 40% by weight of glass fiber from 10 to 400 µm in length and from 10 to 25 µm in diameter.

DESCRIPTION OF THE INVENTION

Those skilled in the art know which thermoplastics are mutually mixable in the melt. For example, polyamides and nylon-6 are mixable, and polypropylene is mixable with polypropylene having a different tacticity and a different molecular weight or with the copolymers EPDM and EPM. Polyethylene is not mixable with polypropylene, but is mixable with polyethylene having a different molecular weight (e.g. HDPE with LDPE). The thermoplastic of the long glass fiber reinforced material and of the short glass fiber reinforced material is preferably the same.

The method used for comminuting the thermoplastic material to be recycled, e.g. used moldings or production scrap, is not critical. The comminuting can be carried out for example by grinding or cutting. In most cases it is sufficient to comminute the material to a size from 1 to 30 mm.

The admixed long glass fiber reinforced thermoplastic material is preferably produced by melt pultrusion of impregnated continuous filament fiber which is then cut to granule length. The long glass fiber reinforced thermoplastic preferably contains from 30 to 60% by weight of glass fiber from 10 to 25 µm in diameter. The fiber or granule length is preferably from 5 to 15 mm.

The fiber content of the material to be recycled should not change significantly. The fiber content of the mixture should therefore be from 0.95 to 1.05 times the fiber content of the short glass fiber reinforced thermoplastic material.

To adjust the thermoplastic content of the mixture there may be additionally added an unreinforced thermoplastic which is likewise mixable in the melt with the short glass fiber reinforced thermoplastic and is in particular the same thermoplastic.

It is advantageous to process a mixture whose thermoplastic content (unreinforced thermoplastic content of the long glass fiber reinforced material and the proportion in the short glass fiber reinforced material) is at least 70% by weight. The process of the present invention is not restricted to a specific thermoplastic material. It is preferably used for recycling polyolefins, in particular polypropylene.

The process of the present invention makes it possible to re-use post-use glass fiber reinforced thermoplastic for making shaped articles and the like having particular requirements in terms of mechanical properties and thermal stability. Surprisingly, the same or a higher level is achievable with respect to the mechanical properties and the thermal stability even when the glass fiber content is kept constant.

The process of the present invention is illustrated by the examples which follow.

EXAMPLE 1

Used articles and production scrap composed of a commercial fiber reinforced polypropylene (melt flow index MFI 230/5=55 g/10 min) containing 30% by weight of glass fiber 10–400 µm in length and 10–25 µm in diameter were ground in a cutting mill into particles 1–30 mm in size.

The ground material was tumble mixed with 10, 20 and 30% by weight in each case of a commercial long glass fiber reinforced polypropylene. In addition, a sufficient amount was added of a polypropylene of density 0.907 g/cm$^3$ and melt flow index MFI 230/5 of 55 g/10 min for the thermoplastic mixture to contain a total of about 30% by weight of glass fiber.

The long glass fiber reinforced polypropylene contained 40% by weight of glass fiber 10 mm in length and 10–25 µm in diameter and had been produced by melt pultrusion.

This mixture was injection molded to fabricate stacking boxes, and samples were cut from these stacking boxes to determine the mechanical properties and the thermal stability.

For comparison, stacking boxes were fabricated in the same way exclusively from used regranulated material (no admixture), and samples were taken from these stacking boxes too.

The results of the tests are shown in Table 1.

Key to materials:

| Material V 1 | PP-KG | molding from virgin material (comparative experiment) |
|---|---|---|
| Material WV-0 | PP-KF- | molding from ground material V1 (comparative experiment) |
| Material WV-10 | PP-KG | according to the present invention, with 10% by weight of PP-LG |
| Material WV-20 | PP-KG | according to the present invention, with 20% by weight of PP-LG |
| Material WV-30 | PP-KG | according to the present invention with 30% by weight of PP-LG | where:
PP-KG: polypropylene reinforced with short glass fiber
PP-LK: polypropylene reinforced with long glass fiber.

EXAMPLE 2

Used articles and production scrap composed of a commercial polypropylene (melt flow index MFI 230/5=4.5 g/10 min) containing 30% by weight of short glass fiber were regranulated, mixed and processed, all three steps being carried out as described in Example 1. The results of the tests are shown in Table 2.

TABLE 1

| | | Material | | | | |
|---|---|---|---|---|---|---|
| Property | Standard | V 1 | WV-0 | WV-10 | WV-20 | WV-30 |
| Tensile strength (Mpa) | DIN 53455 | 46.35 | 40.08 | 41.03 | 47.20 | 48.28 |
| Breaking extension (%) | DIN 53455 | 2.37 | 2.38 | 2.01 | 2.54 | 2.21 |
| Modulus of elasticity (MPa) | DIN 53455 | 3757.5 | 3510 | 3685 | 3860 | 3945 |
| Penetration energy (J/mm) | DIN 53443/2 | 1.58 | 1.32 | 1.41 | 1.53 | 1.84 |
| Oxidation onset (°C.) | | 242.2 | 246.6 | 251.5 | 257.6 | 260.4 |
| Glass fiber content (% by weight) | | 31.0 | 31.3 | 31.2 | 30.6 | 30.5 |

TABLE 2

| | | Material | | | | |
|---|---|---|---|---|---|---|
| Property | Standard | V 1 | WV-0 | WV-10 | WV-20 | WV-30 |
| Tensile strength (Mpa) | DIN 53455 | 51.85 | 47.53 | 48.38 | 49.95 | 51.20 |
| Breaking extension(%) | DIN 53455 | 2.83 | 2.77 | 2.69 | 2.61 | 2.46 |
| Modulus of elasticity (MPa) | DIN 53455 | 3902.5 | 3995 | 4025 | 4010 | 4235 |
| Penetration energy (J/mm) | DIN 53443/2 | 2.11 | 2.04 | 2.10 | 2.07 | 2.41 |
| Oxidation onset (°C.) | | 246.5 | 246.8 | 253.7 | 259.4 | 261.4 |
| Glass fiber content (% by weight) | | 30.8 | 30.7 | 30.7 | 31.1 | 31.6 |

What is claimed is:

1. A process for recycling a short glass fiber reinforced thermoplastic material which comprises comminuting short glass fiber reinforced thermoplastic material containing short glass fibers having lengths less than 400 μm to form a comminuted material, mixing 100 parts by weight of the comminuted material with 11–43 parts by weight of chips of a thermoplastic material which is mixable therewith in the melt but which is long glass fiber reinforced, and forming the mixture thermoplastically.

2. The process of claim 1 wherein the short glass fiber reinforced and/or long glass fiber reinforced thermoplastic material comprises polyolefin.

3. The process of claim 1 wherein the short glass fiber reinforced thermoplastic material which is comminuted contains 20–40% by weight of glass fiber from 10 to 400 μm in length and from 10 to 25 μm in diameter.

4. The process of claim 1 wherein the short glass fiber reinforced thermoplastic material is comminuted to a particle size of 1–30 mm.

5. The process of claim 1 wherein the long glass fiber reinforced thermoplastic material comprises continuous filament fiber impregnated by melt pultrusion and cut to granule length.

6. The process of claim 1 or 5 wherein the long glass fiber reinforced thermoplastic material contains 30–60% by weight of glass fiber 10–25 μm in diameter.

7. The process of claim 1 wherein the thermoplastic mixture has additionally added to it an unreinforced thermoplastic which is mixable in the melt with the thermoplastic of the short glass fiber reinforced material and the long glass fiber reinforced material.

8. The process of claim 1 or 7 wherein the proportion of the long glass fiber reinforced thermoplastic material and the proportion of thermoplastic present therein are dimensioned in such a way as to produce a mixture whose thermoplastic content is at least 70% by weight.

9. The process of claim 1 wherein the fiber content of the mixture obtained is dimensioned in such a way that it amounts to from 95 to 105% of the fiber content of the short glass fiber reinforced thermoplastic material.

10. The process as claimed in claim 1, wherein the short glass fiber reinforced and/or long glass fiber reinforced thermoplastic material comprise polypropylene.

11. The process as claimed in claim 1, wherein said chips of thermoplastic material are from 5 to 15 mm.

12. The process as claimed in claim 5, wherein said granule length ranges from 5 to 15 mm.

13. A process for recycling a short glass fiber reinforced thermoplastic material comprising the steps of:
 (a) comminuting recycled short glass fiber reinforced thermoplastic material containing short glass fibers having lengths ranging from 10 to 400 μm to form a comminuted material;
 (b) mixing 100 parts by weight of said comminuted material with 11–43 parts by weight of a long glass fiber reinforced thermoplastic material to form a mixture; and
 (c) forming the mixture thermoplastically to form an article,
 wherein said recycled short glass fiber reinforced thermoplastic material and said long glass fiber reinforced thermoplastic material are mutually mixable in a melt.

14. The process as claimed in claim 13, wherein the recycled short glass fiber reinforced thermoplastic material and/or the long glass fiber reinforced thermoplastic material comprise polyolefin.

15. The process as claimed in claim 13, wherein the recycled short glass fiber reinforced thermoplastic material and the long glass fiber reinforced material comprise the same thermoplastic material.

16. The process as claimed in claim 1, wherein the step of forming the mixture thermoplastically results in a shaped article having mechanical properties which are at least equal to the mechanical properties of a virgin product.

17. The process as claimed in claim 13, wherein the step of forming the mixture thermoplastically results in a shaped article having mechanical properties which are at least equal to the mechanical properties of a virgin product.

18. The process as claimed in claim 13, wherein the recycled short glass fiber reinforced thermoplastic material is comminuted to a particle size of 1–30 mm.

19. The process of claim 1, wherein said step of forming the mixture thermoplastically comprises extrusion.

20. The process of claim 1, wherein said step of forming the mixture thermoplastically comprises injection molding.

21. The process of claim 13, wherein said step of forming the mixture thermoplastically to form an article comprises extrusion.

22. The process of claim 13, wherein said step of forming the mixture thermoplastically to form an article comprises injection molding.

23. A process for recycling a short glass fiber reinforced thermoplastic material comprising the steps of:

(a) comminuting recycled short glass fiber reinforced thermoplastic material containing short glass fibers having lengths less than 400 μm to form a comminuted material;

(b) mixing 100 parts by weight of said comminuted material with 11–43 parts by weight of a long glass fiber reinforced thermoplastic material to form a mixture; and (c) forming the mixture thermoplastically by injection molding to form an article, wherein said recycled short glass fiber reinforced thermoplastic material and said long glass fiber reinforced thermoplastic material are mutually mixable in a melt.

24. The process of claim 23, wherein the short glass fiber reinforced and/or long glass fiber reinforced thermoplastic material comprises polyolefin.

25. The process of claim 23, wherein the short glass fiber reinforced and/or long glass fiber reinforced thermoplastic material comprises polypropylene.

26. The process of claim 23, wherein said long glass fiber reinforced thermoplastic material is in the form of granules having a length ranging from 5 to 15 mm.

27. The process of claim 23, wherein the recycled short glass fiber reinforced thermoplastic material is comminuted to a particle size of 1–30 mm.

* * * * *